United States Patent [19]

Bertelli et al.

[11] 4,198,328

[45] Apr. 15, 1980

[54] FLAME-RESISTING INTUMESCENT PAINTS

[75] Inventors: Guido Bertelli; Pierpaolo Roma; Renato Locatelli, all of Ferrara, Italy

[73] Assignee: Montedison S.p.A., Milan, Italy

[21] Appl. No.: 949,126

[22] Filed: Oct. 6, 1978

[30] Foreign Application Priority Data

Oct. 10, 1977 [IT] Italy ............................... 28413 A/77

[51] Int. Cl.² .................... C09D 3/48; C09D 3/66; C09D 5/18
[52] U.S. Cl. .................... 260/22 A; 106/18; 106/15; 106/18.17; 106/18.18; 252/8.1; 260/22 TN; 260/DIG. 24; 428/276; 428/278; 428/920; 428/921
[58] Field of Search ....... 260/DIG. 24, 22 A, 22 TN; 106/15 R, 15 FP, 18.15, 18.17, 18.18; 428/920, 921, 276, 278; 252/8.1

[56] References Cited

U.S. PATENT DOCUMENTS

| | | | |
|---|---|---|---|
| 2,526,462 | 10/1950 | Edelstein | 428/276 |
| 3,247,015 | 4/1966 | Zimmerman et al. | 428/278 |
| 3,372,131 | 3/1968 | Rohlfs et al. | 428/921 |
| 3,654,190 | 4/1972 | Levine | 260/28.5 B |
| 3,733,289 | 5/1973 | Burns et al. | 260/28.5 R |
| 3,810,862 | 5/1974 | Mathis et al. | 260/42.45 |
| 3,864,076 | 2/1975 | Nachbur | 428/921 |
| 3,874,990 | 4/1975 | Surdyk | 260/17.3 |
| 3,908,051 | 9/1975 | Yamamoto | 428/276 |
| 3,914,513 | 10/1975 | Brown et al. | 428/921 |
| 3,925,137 | 12/1975 | Kamei | 428/921 |
| 3,934,066 | 1/1976 | Murch | 428/278 |
| 3,936,416 | 2/1976 | Brady | 260/42.46 |
| 3,936,420 | 2/1976 | Gray | 260/45.8 NT |
| 3,955,987 | 5/1976 | Schaar et al. | 252/8.1 |
| 3,957,881 | 5/1976 | Leblanc et al. | 428/921 |
| 4,043,987 | 8/1977 | Jolicoeur et al. | 252/8.1 |

FOREIGN PATENT DOCUMENTS

1061503 7/1959 United Kingdom .

*Primary Examiner*—Ronald W. Griffin
*Attorney, Agent, or Firm*—Morgan, Finnegan, Pine, Foley & Lee

[57] ABSTRACT

The present invention concerns flame-resisting paints, in particular, those which can be applied on wood, metals and plastic materials or elastomers. More particularly, it concerns "intumescent paints" endowed with excellent fire-resistance characteristics.

7 Claims, No Drawings

FLAME-RESISTING INTUMESCENT PAINTS

The present invention relates to intumescent paints endowed with flame-resistance properties, having as essential constituents a polymeric base for paints, a diluent, a source of phosphoric acid, a source of carbon and an intumescing agent, characterized in that said paints contain as a carbon source and intumescing agent a single, water-insoluble, nitrogen containing product chosen from amongst (a) reaction products of an aldehyde with compounds containing two —NR— groups or a —NR— group and a —CO— and/or —CS— group inserted in a cyclic structure (R=H or hydroxyalkyl with 1–4 carbon atoms) and (b) reaction products from aliphatic or aromatic diisocyanates or triisocyanates with organic compounds having in the molecule reactive hydrogen atoms.

BACKGROUND OF INVENTION

The phenomenon of the intumescence is known: when film of paint is subjected to the action of a flame, at first it changes into a plastic mass which then starts to swell because of the formation of incombustible gases which remain trapped in the film causing the latter to expand up to about 50 times the original thickness. The cellular layer that thus is formed solidifies into a spongy, practically incombustible mass which isolates the substrate to be protected and hinders the admission of air.

In order to obtain the phenomenon of intumescence, in general there are needed three components:

(1) a source of carbon, consisting of a carbohydrate such as starch or glucose, or of a polyvalent alcohol such as pentaerythritol or its dimer or trimer;

(2) a dehydrating agent capable of promoting the formation of a carbonaceous mass starting from carbohydrate and in general consisting of a source of phosphoric acid, such as ammonium or melamine phosphate: the dehydrating agent decomposes while releasing phosphoric acid which esterifies the hydroxyl groups of the carbohydrate under formation of a phosphoric ester which subsequently chars;

(3) an intumescing agent that decomposes while releasing incombustible gases that expand the film of paint, said agent consisting either of nitrogen containing compounds such as urea, melamine, dicyandiamide, or also of a partially halogenated organic compound such as a paraffin wax chlorinated at 70% by weight of chlorine.

The three above indicated components cannot be chosen arbitrarily; the dehydrating agent must have a decomposition temperature near the decomposition temperature of the intumescing agent. If, for instance, the intumescing agent decomposes at a temperature considerably greater than that at which the dehydrating agent decomposes, then the film of paint solidifies to a carbonaceous mass before it expands, and consequently this hinders the formation of a multicellular layer.

OBJECTS OF THIS INVENTION

An object of this invention is to provide improved intumescent paints having flame resistance properties. Other objects of this invention will be apparent from the discussion which follows:

GENERAL DESCRIPTION OF THE INVENTION

It has been found that the objects of this invention may be realized by using as a source of carbon and intumescing agent a single water-insoluble nitrogen containing product, chosen among those indicated hereinafter.

More particularly, the flame-resisting paints according to this invention consist of the following essential components, besides other possible additives normally used in the techniques of the field:

(1) from 10 to 20 parts of a solvent normally used as paint diluent, such as, for example, benzene, toluene, xylenes, chlorinated aliphatic hydrocarbons, esters, alcohols, oil of turpentine, white spirit and water;

(2) from 30 to 60 parts of a binder or base of a polymeric nature such, for example, as polyurethane resins, phenolic resins, ureic resins, epoxy resins, alkyd resins, acrylic resins, vinyl resins, polybutadiene, polyisoprene, polychloroprene, polyisobutylene, butadiene-acrylonitrile or butadiene-styrene copolymers, random propylene-ethylene copolymers and still others;

(3) from 15 to 35 parts of an ammonium or amine phosphate;

(4) from 7 to 18 parts of one or more water-insoluble nitrogen containing compounds chosen from among: (a) the reaction products of an aldehyde with compounds containing two —NR— groups or an —NR— group and a —CO— and/or —CS— group inserted in a cyclic structure (R=H or hydroxyalkyl with from 1 to 4 carbon atoms), and (b) the reaction products of aliphatic or aromatic diisocyanates or triisocyanates with organic compounds having in the molecule reactive hydrogen atoms.

Among the various usable phosphates, those preferred for their easy availability are the ammonium polyphosphates falling within the general formula $(NH_4)_{n+2}P_nO_{3n+1}$, wherein n represents a whole number equal to or greater than 2; preferably the molecular weight of the polyphosphates must be sufficiently high to ensure a low solubility in water.

The composition of the polyphosphates having the above indicated formula, in which n is a number sufficiently great, is practically that which corresponds to the formula of the metaphosphates $(NH_4PO_3)_n$.

An example of such polyphosphates is the one known under the trade mark "Exolit 263" (produced and marketed by the firm Benckiser Knapsack GmbH) and having the composition $(NH_4PO_3)_n$ wherein n is greater than 50; another example is the product known under the trade mark "Phos-Chek P/30" (produced and marketed by Monsanto Chemical Co.) and having an analogous composition.

Other usable phosphates are those derived from amines, such as for instance dimethylammonium or diethylammonium phosphate, ethylendiamine phosphate, ortho- or pyrophosphate of melamine.

An example of melamine phosphate is that which is obtained by treating an aqueous melamine solution heated at 70°–90° C. with $H_3PO_4$ and then separating the precipitate that thus forms the two reactants being used in a molar ratio $H_3PO_4$/melamine, of about 3:2.

Examples of compounds to be used in the form of reaction products with the aldehydes are: ethyleneurea, ethylene-thiourea, hydantoin, hexahydropyrimidin-2-one, piperazine-3,6-dione, barbituric acid, uric acid, piperazine, 1,4-bis(2-hydroxypropyl)piperazine, tris(2-hydroxyethyl) isocyanurate.

The preferred aldehyde is formaldehyde.

As compounds having in the molecule reactive hydrogen atoms, besides those mentioned above, there may also be cited: ethylenediamine, tetramethylene diamine, phenylene diamines, toluylene diamines, xylylene diamines, melamine, besides polyvalent alcohols such as: ethyleneglycol, diethyleneglycol, triethyleneglycol, glycerol, trimethylol ethane, trimethylol propane, pentaerythritol, dipentaerythritol, tripentaerythritol, 1,2,4-butane triol, 1,2,6-hexane triol, and like others.

Among the organic isocyanates usable in the reaction with the compounds having reactive hydrogen atoms, there may be cited: hexamethylene diisocyanate, 2,4 and 2,6-toluylene diisocyanate, o-, m- and p-phenylene diisocynate, diphenyl methane 4,4'-diisocynate, dianisidine diisocyanate, tolidine diisocyanate and triphenylmethane triisocyanate.

The reaction products of the aldehydes with the cyclic nitrogen containing compounds are prepared according to known methods: an aqueous solution of the nitrogen containing compound, acidified with $H_2SO_4$ (pH=2-3), is made to react at between 80° and 100° C. under stirring, with an aqueous, 37% by weight/volume formaldehyde solution that is added dropwise at a ratio of 1-1.5 mols per functional group present in the nitrogen containing compound. For the reaction there may be used a glass flask provided with a dripping funnel, a stirrer and a reflux cooler. The polycondensate obtained precipitates in the form of a finely subdivided powder which is then filtered, washed and dried.

The reaction products of the organic isocyanates with the compounds having reactive hydrogen atoms, are prepared by introducing the two reactants into the flask of a rotary evaporator, and heating the suspension thus obtained at a temperature comprised between 100° C. and 180° C., for a time varying between 1 and 3 hours, depending on the temperature chosen: if this latter is, for instance, 150° C., a 2 hour heating will suffice. Practically, the reaction between the two compounds develops stoichiometrically in as much as each functional group of one of the reactants reacts with one functional group of the other reactant; it follows that the molar ratio between the two reactants will depend on the number of functional group present in each of the reactants. Thus, for instance, a diisocyanate will be made to react with pentaerythritol in a molar ratio of 2:1, while it will be made to react with ethylene diamine in a molar ratio of 1:1. At the end of the reaction there will be obtained a solid product that is washed with acetone, then with water and then again with acetone in order to remove the unreacted compounds.

The intumescent paints according to the invention are prepared according to anyone of the known techniques for mixing the components.

The anti-flame properties of the paints which are the object of this invention are practically independent from the nature of the polymer used as binder which may thus be anyone of the polymers normally used as bases for paints.

The intumescent paints of the invention may be applied, possibly with the aid of a "primer", on materials of any kind: wood, metals and plastic or elastomeric materials, as for instance polypropylene, polyethylene, polystyrene, polyethyleneterephthalate, polyamides, ABS resins, ethylene-propylene rubbers, mixtures of polypropylene with the latters, polyisobutylene, polychloroprene, polybutadiene.

They are characterized, besides by excellent anti-flame properties at thickness of films lower than those of the "Prior Art", also by a low development of smokes in case of fire and by a great resistance to water and to atmospheric agents (moisture, salty mist, thermal cycles); they may also be used in the field of washable surfaces without any loss in the course of time of their flame-resistance characteristics and can be applied according to all known methods, such as for instance: brushing, spraying, dipping or roller spreading.

Determination of the degree of flame resistance of painted manufactured articles (1) On polymeric materials. Onto one face of a circular plate of the material to be painted, having a diameter of 10 cm and a thickness of 3 mm, there is applied the paint under examination at such a quantity that the film thickness after drying is comprised between 50 and 150 micron; greater thicknesses are advisable for plates of polymeric materials with a lower softening temperature.

The discoid specimen is placed onto a special support and the painted face of the specimen is brought near the flame of a Bunsen burner adjusted to a height of 4 cm so that the flame shall hit the specimen in the center of same, while the distance between the specimen and the burner shall be 3 cm and the angle of the flame with respect to the perpendicular to the test plate shall be 30°. Thereupon, various ignition attempts are carried out for ever increasing stretches of time, until finding the time, in seconds, necessary for causing the lighting of the test plate: the series of attempts is interrupted once the plate lights up or when there appears an evident deformation of the test piece structure or when the series is protracted beyond a reasonable limit of time without having either lighting or deformation of the test piece (the case of wooden test pieces).

(2) On wood.

There are used square wooden plates of light plywood of 10 cm×10 cm and 4 mm thick, while for the rest one proceeds as already described for the plates of polymeric materials.

SPECIFIC DESCRIPTION OF THE INVENTION

EXAMPLES NOS. 1-6

The tests of these examples have been carried out with intumescent paints having as a base a bicomponent polyurethane obtained from:

(A) a mixture, in a weight ratio of 1:1 of (1) an alkyd resin from trimethylolpropane, phthalic anhydride and synthetic saturated fatty acids, and (2) a vinyl chloride/vinyl acetate copolymer in a weight ratio of 87:13; and (B) an isocyanic resin having a content of —NCO groups of about 13%, from trimethylolpropane and 2,4-toluylenediisocyanate.

These paints have been applied on test pieces of polypropylene and of plywood. In order to favour the adhesion of the paint of the polypropylene test piece, on this latter there was applied the primer "PP 5121" of Worlie Chemie Kunstharzfabrik.

Example 1 is a comparative example (on the test piece no paint was applied), while in examples from 2 to 6, besides an ammonium polyphosphate, there were used reaction products of formaldehyde or of 2,4-toluylenediisocyanate with various compounds.

The results thereby obtained have been recorded on Table I.

TABLE 1

Intumescent paints applied on polypropylene and on wood.

| Paint ingredients | | | Ex. 1 | Ex. 2 | Ex. 3 | Ex. 4 | Ex. 5 | Ex. 6 |
|---|---|---|---|---|---|---|---|---|
| Polyurethane | | | — | 40 | 40 | 40 | 40 | 40 |
| Ammonium polyphosphate("Phos-Chek P/30") | | | — | 28 | 28 | 28 | 28 | 28 |
| Ethylene-urea/$CH_2O$ | | | — | 14 | — | — | — | — |
| Hexahydropyrimidin-2-one/$CH_2O$ | | | — | — | 14 | — | — | — |
| Piperazine/$CH_2O$ | | | — | — | — | 14 | — | — |
| Melamine/toluylene 2,4-diisocyanate | | | — | — | — | — | 14 | — |
| Glycerol/toluylene 2,4-diisocyanate | | | — | — | — | — | — | 14 |
| Toluene + xylene in equal volumes (diluent) | | | — | 18 | 18 | 18 | 18 | 18 |
| Resistance to flame | On polypropylene (Paint thickness 100μ) | Time required for causing ignition | 20 sec. | >60 sec. | >60 sec. | >60 sec. | >60 sec. | >60 sec. |
| | On plywood (paint thickness 100μ) | Time required for causing ignition | 30 sec. | >180 sec. | >180 sec. | >180 sec. | >180 sec. | >180 sec. |

EXAMPLES 7-10

In this set of examples there were used paints having as a base the same polyurethane used in the tests of examples from 2 to 6, except that they contained different phosphoric acid donors.

The tests have been carried out applying the paints on plates of different materials. On those made of polymeric materials, before painting, there was applied the primer "PP 1.146.020" produced by Italver-Pittsburg Paints.

Example No. 7 is a comparative example (plate without paint coat).

The results thereby obtained have been recorded on Table II.

An epoxy resin there was used a commercial resin consisting of a reaction product between epichlorohydrin and bisphenol A, having an epoxy equivalent of about 200, and containing a surfactant of a ionic nature which makes the resin water dispersible.

As an alkyd resin there was used a resin prepared by the reaction of glycerol with phthalic anhydride and with linseed oil.

The tests were carried out by applying the paints on specimens of polypropylene and of plywood; before painting on the specimen of polypropylene there was applied the primer "PP 5121" produced by Worlie Chemie Kunstharzfabrik.

Example 11 is a comparative example (test piece without a paint coat).

TABLE II

Intumescent paints applied on polypropylene, ABS resin, polystyrene, polyethylene, SBR elastomers and wood.

| Paint Ingredients | | | Ex. 7 | Ex. 8 | Ex. 9 | Ex. 10 |
|---|---|---|---|---|---|---|
| Polyurethane | | | — | 40 | 40 | 40 |
| "Phos-Chek P/30" (ammonium polyphosphate) | | | — | 28 | — | — |
| "Exolit 263" (ammonium polyphosphate) | | | — | — | 28 | — |
| Melamine phosphate | | | — | — | — | 28 |
| Ethylene-urea/$CH_2O$ | | | — | 14 | 14 | 14 |
| Toluene + xylene in equal volumes (diluent) | | | — | 18 | 18 | 18 |
| Resistance to flame | On polypropylene | Time required for causing ignition | 20 sec. | >60 sec. | >60 sec. | >60 sec. |
| | On ABS resin | same | 25 sec. | >60 sec. | >60 sec. | >60 sec. |
| | On polystyrene | same | 20 sec. | >60 sec. | >60 sec. | >60 sec. |
| | On HD polyethylene | same | 15 sec. | >50 sec. | >50 sec. | >50 sec. |
| | On unvulcanized SBR elastomer | same | 25 sec. | >50 sec. | >50 sec. | >50 sec. |
| | On vulcanized SBR elastomer | same | 30 sec. | >120 sec. | >120 sec. | >120 sec. |
| | On plywood | same | 30 sec. | >180 sec. | >180 sec. | >180 sec. |

NOTE:
The thickness of the layer of paint on the various test pieces, after drying, is 100μ (microns).

EXAMPLES NOS. 11-13

In this set of examples there have been used paints having as a base either an epoxy or alkyd resin.

The results thereby obtained have been recorded on Table III.

TABLE III

Intumescent paints having as a base an epoxy or alkyd resin.

| Paint Ingredients | Ex. 11 | Ex. 12 | Ex. 13 |
|---|---|---|---|
| Epoxy resin | — | 40 | — |
| Alkyd resin | — | — | 40 |
| Ammonium polyphosphate ("Exolit 263") | — | 28 | 28 |
| Ethylene-urea/$CH_2O$ | — | 14 | 14 |
| Water (diluent) | — | 18 | — |
| Petrol (diluent) | — | — | 18 |
| On polypropylene | | | |

TABLE III-continued

| | Intumescent paints having as a base an epoxy or alkyd resin. | | | | |
|---|---|---|---|---|---|
| | | | Parts by weight | | |
| Paint Ingredients | | | Ex. 11 | Ex. 12 | Ex. 13 |
| Resistance to flame | (Paint layer thickness 100μ) | Time required for causing ignition | 20 sec. | >60 sec. | >60 sec. |
| | On plywood (paint layer thickness 100μ) | Time required for causing ignition | 30 sec. | >180 sec. | >180 sec. |

We claim:

1. Intumescent paints endowed with flame-resistance properties, having as essential constituents a polymeric base for paints, a diluent, a source of phosphoric acid, a source of carbon and an intumescing agent, characterized in that said paints contain as a carbon source and intumescing agent a single, water-insoluble, nitrogen containing product chosen from among (a) reaction products of an aldehyde with compounds containing two —NR— groups or a —NR— group and a —CO— and/or —CS— group inserted in a cyclic structure (wherein R=H or hydroxyalkyl having 1-4 carbon atoms) and (b) reaction products from aliphatic or aromatic diisocyanates or triisocyanates with organic compounds having in the molecule reactive hydrogen atoms.

2. Paints according to claim 1, characterized in that they consist essentially of:
   (a) 10-20 parts of a diluent;
   (b) 30-60 parts of a polymeric base for paints;
   (c) 15-35 parts of an ammonium or amine phosphate;
   (d) 7-18 parts of one or more nitrogen containing, water insoluble compounds chosen from amongst
      (a) reaction products of an aldehyde with compounds containing two —NR— groups or a —NR— group and a —CO— and/or —CS— group inserted in a cyclic structure (R=H or hydroxyalkyl with 1-4 carbon atoms), and (b) reaction products of aliphatic or aromatic diisocyanates or triisocyanates with organic compounds having in the molecule reactive hydrogen atoms.

3. Paints according to claim 1, in which as a nitrogen containing, water insoluble product there is used a reaction product ethylene-urea/formaldehyde.

4. Paints according to claim 1, in which as a nitrogen containing, water insoluble product there is used a reaction product hexahydropyrimidin-2-one/formaldehyde.

5. Paints according to claim 1, in which as a nitrogen containing, water insoluble product there is used a reaction product piperazine/formaldehyde.

6. Paints according to claim 1, in which as a nitrogen containing, water insoluble product there is used a reaction product melamine/toluylene 2,4-diisocyanate.

7. Paints according to claim 1, in which as a nitrogen containing, water insoluble product there is used a reaction product glycerol/toluylene 2,4-diisocyanate.

* * * * *